United States Patent [19]
Yang

[11] Patent Number: 5,915,399
[45] Date of Patent: Jun. 29, 1999

[54] MULTIPURPOSE COVER FOR CAR

[75] Inventor: Ming-shun Yang, Taipei, Taiwan

[73] Assignee: Formosa Saint Jose Corp., Taipei, Taiwan

[21] Appl. No.: 08/871,542

[22] Filed: Jun. 9, 1997

[51] Int. Cl.$^6$ .............................. E04H 15/06; B60J 11/00
[52] U.S. Cl. .................................. 135/88.01; 135/88.05; 135/88.07; 135/88.13; 135/119; 296/136; 296/163; 150/166
[58] Field of Search ................................ 135/88.1, 88.01, 135/88.03, 88.07, 88.09, 88.13, 88.14, 88.15, 91, 88.05, 88.02, 119; 296/77.1, 136, 164, 163; 160/121.1, 238; 150/166

[56] References Cited

U.S. PATENT DOCUMENTS

| | | | |
|---|---|---|---|
| Re. 29,264 | 6/1977 | Woodward | 135/88.16 X |
| 1,770,841 | 7/1930 | Clyman | 135/88.02 X |
| 2,646,097 | 7/1953 | Gaverth et al. | 296/136 |
| 3,390,913 | 7/1968 | Hunter | 296/164 X |
| 4,773,694 | 9/1988 | Gerber | 296/77.1 |
| 4,938,522 | 7/1990 | Herron et al. | 296/136 |
| 5,188,417 | 2/1993 | Curchod | 296/136 |
| 5,217,275 | 6/1993 | Ridge | 296/77.1 |
| 5,417,469 | 5/1995 | Hammond | 135/88.07 X |
| 5,423,587 | 6/1995 | Ingram | 135/88.13 X |
| 5,497,819 | 3/1996 | Chiang | 150/166 |

Primary Examiner—Carl D. Friedman
Assistant Examiner—Winnie Yip
Attorney, Agent, or Firm—Eric M. Arnhem

[57] ABSTRACT

Disclosed is a multipurpose cover for car mainly including a roof sunshade for covering the roof of car, four screen-like knitting fabrics for separately covering the windshield, the rear window, and side windows of car, four side sunshades for covering a front, a rear, and two side parts of car, and four roll-up sunshades for covering the four screen-like knitting fabrics. These sunshades or fabrics are sewed together to form a complete cover for car. The roll-up sunshades are provided at their two lateral sides with zippers and at lower edges with hooks connected to the roll-up sunshades by means of elastic bands. Two of the screen-like knitting fabrics covering two sides of the car and their corresponding side sunshades have a vertical split at their middle portion. Zippers are sewed to these splits to facilitate opening of doors via the splits. The cover for car serves to block sunlight and snows, and keep out mosquitoes and flies.

2 Claims, 5 Drawing Sheets

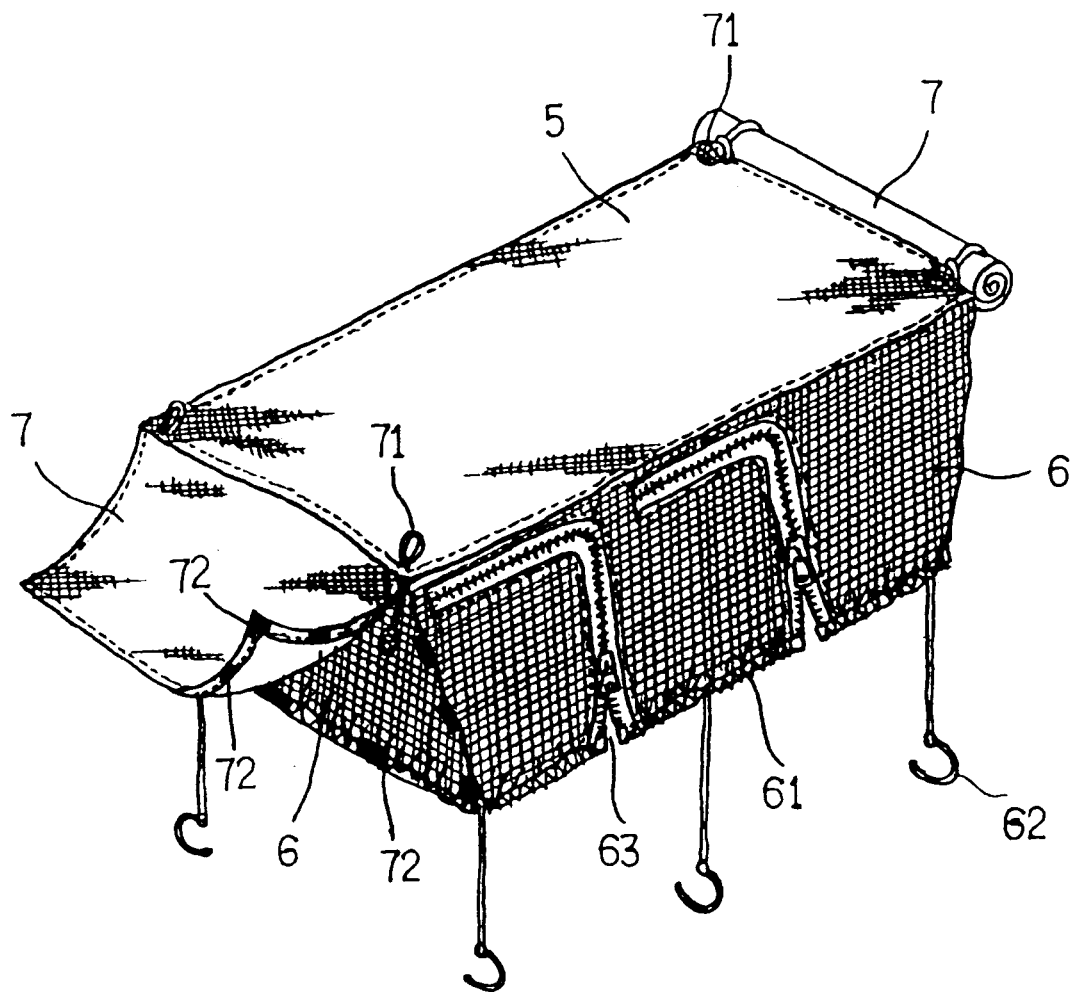
F I G. 3

MULTIPURPOSE COVER FOR CAR

BACKGROUND OF THE INVENTION

It has become a popular activity of people at leisure to drive to the suburbs or countryside to enjoy the natural sights and a comfortable day. There are instances where people need to take a rest or to sleep in the car instead of a camp during their outdoor activities in the countryside. It is convenient to rest or sleep in a car. However, it is possible that a user may be disturbed by insects, mosquitoes, flies if the windows of the car are opened to let in fresh air. On the other hand, if the windows of the car are closed to keep out insects, mosquitoes, flies, etc., it might become necessary to turn on the air conditioning to keep fresh air in the car. It is, of course, energy-consuming to turn on the air conditioning all the time.

Another factor that may disturb people's rest or sleep in a car is the sunlight that directly shines into the car.

In winter, snow sometimes cover the windshield and the rear window of the car so as to block the driver's sight. It is labor-consuming to clean the snow that may collect on the windshield and the rear window.

To fully utilize a car as an ideal place for rest or sleep during an outdoor activity in countryside or suburbs, the present invention contemplates a multipurpose cover for a car. When a car is covered by the multipurpose cover, the windows can be opened to let in fresh air while the insects, mosquitoes, flies and so on are kept out of the car.

Moreover, the multipurpose car cover may also be used in summer to block strong sunlight and in winter to prevent snow from directly collecting on the windshield and the rear window of the car.

SUMMARY OF THE INVENTION

The multipurpose cover for a car according to the present invention mainly includes a roof sunshade for covering the roof of the car, four screen-like knitting fabrics for separately covering the windshield, the rear window, and side windows of car, four side sunshades for covering a front, a rear, and two side parts of the car, and four roll-up sunshades for covering the four screen-like knitting fabrics. These sunshades or fabrics are sewed together to form a complete cover for the car. The roll-up sunshades are provided at two lateral sides with zippers and at lower edges with hooks connected to the roll-up sunshades by means of elastic bands. Two of the screen-like knitting fabrics covering two sides of the car and their corresponding side sunshades have a vertical split at their middle portion. Zippers are sewed to these splits to facilitate opening of doors via the splits. The car cover according to the present invention serves to block sunlight and snow, and keep out mosquitoes and flies.

BRIEF DESCRIPTION OF THE DRAWINGS

FIG. 3 is a perspective showing a second embodiment of the present invention;

DETAILED DESCRIPTION OF THE PREFERRED EMBODIMENTS

Figure 1:
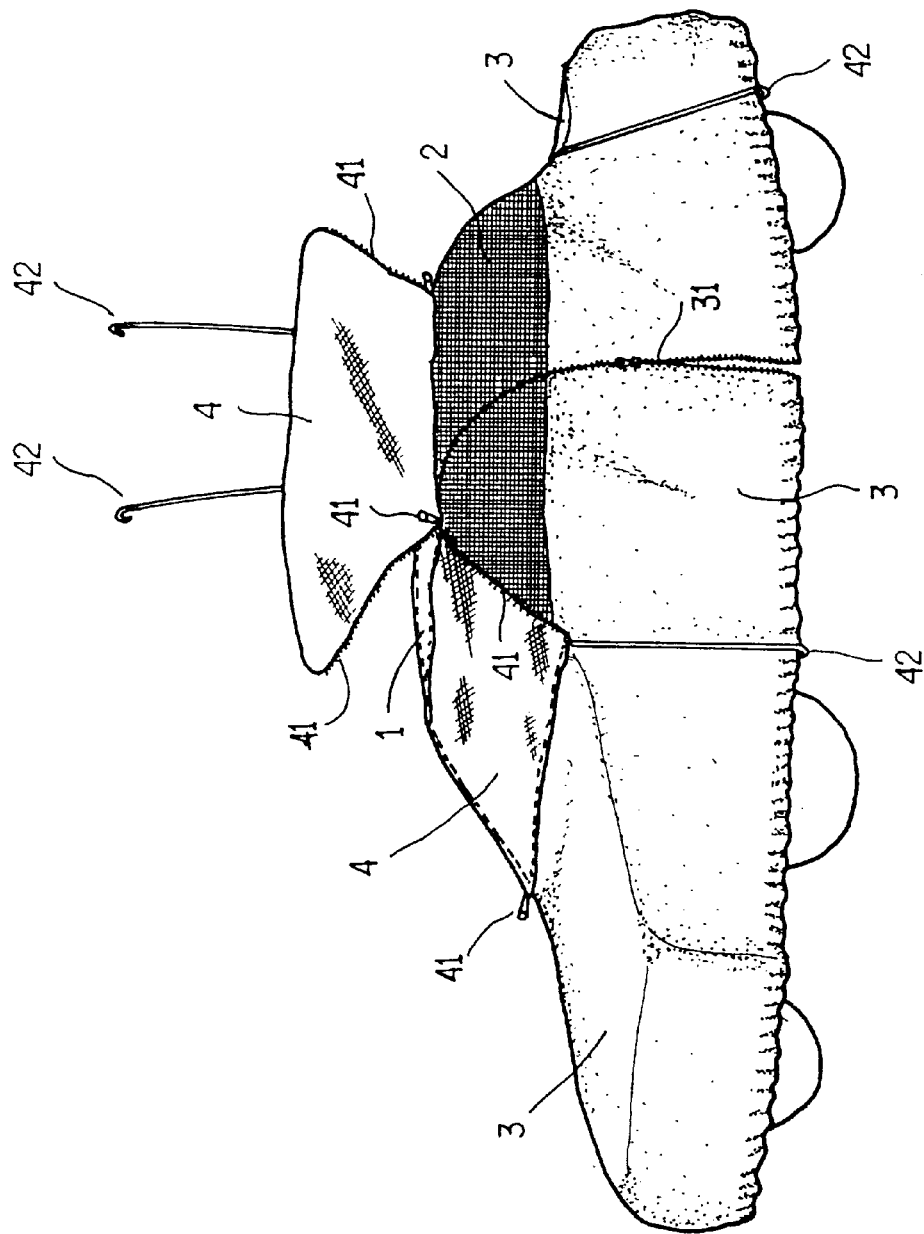
FIG. 1 illustrates a first embodiment of the present invention being used to cover a sedan car.
Figure 2:
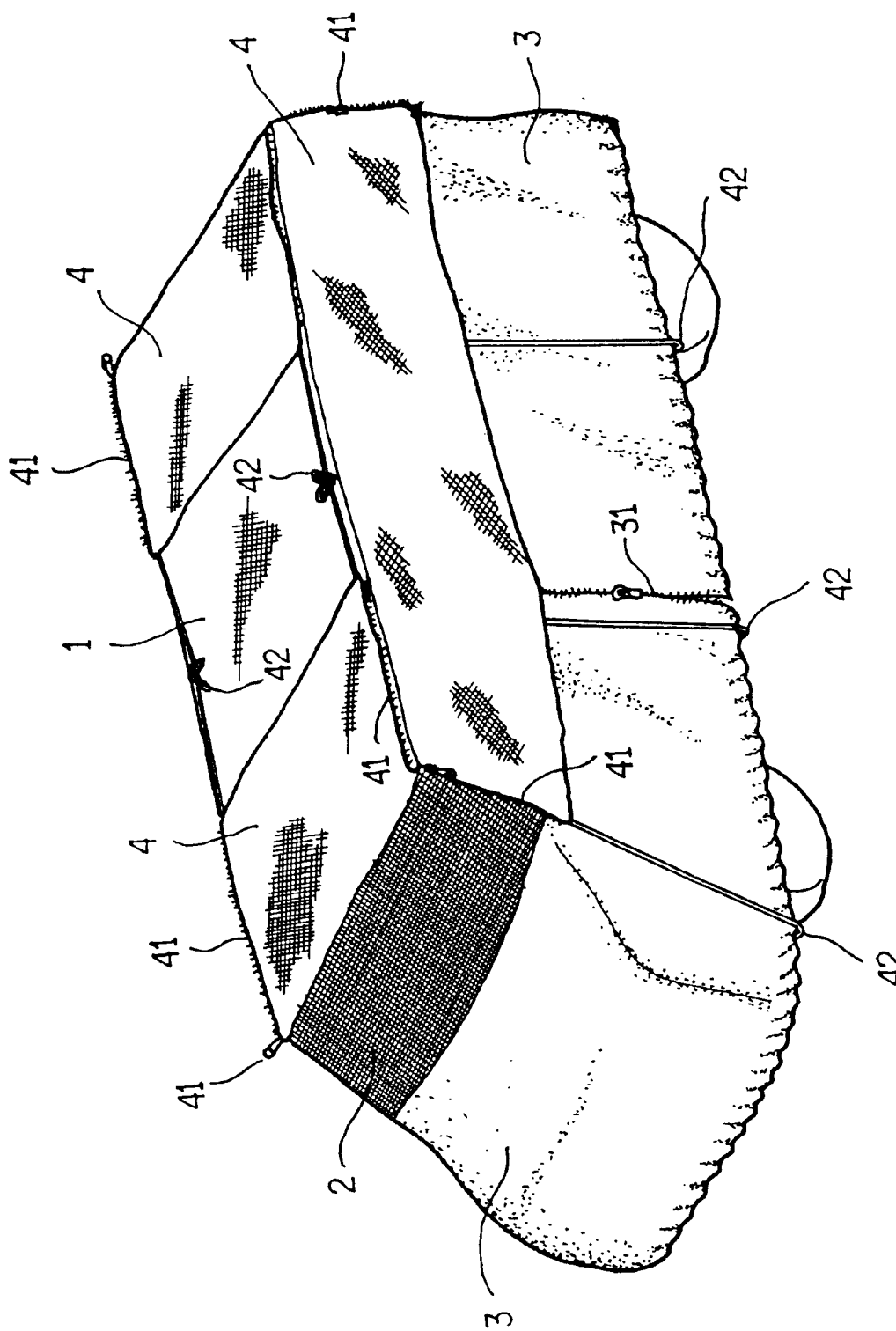
FIG. 2 illustrates the first embodiment of the present invention being used to cover a station wagon.

Please refer to FIGS. 1 and 2 in which a first embodiment of the present invention is shown. The present invention generally relates to a multipurpose cover for a car mainly including a roof sunshade (1) for covering a roof of the car, four air-pervious and screen-like knitting fabrics (2) for separately covering a front, a rear, and two side windows of the car, four side sunshades (3) for separately covering a front part, a rear part, and two lateral parts of the car, and four roll-up sunshades (4). The four screen-like knitting fabrics (2) are connected at upper edges to four edges of the roof sunshade (1) by sewing, and at lower edges to four upper edges of the four side sunshades (3) also by sewing, so that an integral cover is formed to completely cover a car.

The roof sunshade (1), the side sunshades (3), and the roll-up sunshades (4) of the multipurpose cover for car as illustrated in FIGS. 1 and 2 all are made of tough, and light and air impervious fabrics to effectively block rainwater, sunlight, and external high temperature, so that the car using the cover of the present invention can always keep its interior in a cool and comfortable condition. The screen-like knitting fabrics (2) has numerous very fine openings and is therefore air pervious while it can also effectively stop sunlight from directly shining into the car.

The four roll-up sunshades (4) are separately sewed to upper edges of the four screen-like knitting fabrics (2), so that they are foldably or rollably hung down from the upper edges of the screen-like knitting fabrics (2) to cover the same. Each of the four roll-up sunshades (4) is provided at each lateral side with a zipper (41). Every two adjacent roll-up sunshades (4) can be detachably locked together by two adjacent zippers (41). A plurality of hooks (42) are connected to lower edges of the roll-up sunshades (4) by means of elastic bands.

When the roll-up sunshades (4) are fully extended to hang down from the upper edges of the screen-like knitting fabrics (2), they can completely cover the knitting fabrics (2) and to block sunlight and rainwater. When the roll-up sunshades (4) are in their extended state, they can be connected together by fastening the zippers (41). When the hooks (42) are hooked to lower edges of wheel caps and the car body, the roll-up sunshades (4) and the whole car cover formed from the roof sunshade (1), the screen-like knitting fabrics (2), and the side sunshades (3) are firmly covered on the car without the risk of being blown away by strong wind.

To brighten the interior of car, one or more roll-up sunshades (4) can be folded, rolled up or turned to lie on the roof. Hooking the hooks (42) with elastic bands one another or tying them together over the roof ensures well location of the roll-up sunshades (4) on the roof. Sunlight is then allowed to shine through the screen-like knitting fabrics (2) and window glasses and into the car.

The cover of the present invention is particularly suitable for using in areas where snows shall cover the car in winter. When a car using the cover of the present invention is covered by snows, a driver needs only to loosen the hooks (42) from the car body and turn the roll-up sunshades (4) to remove snows on the sunshades (4), and remove the whole cover of the present invention from the car. No snow will leave on the windshield and the rear window to block the driver's sight.

The screen-like knitting fabrics (2) and the side sunshades (3) particularly for covering windows at two lateral sides of car are provided at their middle position with a zipper (31), so that the knitting fabrics (2) and the side sunshades (3) at two lateral sides of the car can be conveniently opened apart at the zippers (31) to allow a user to enter the car via the doors without the need to completely remove the cover from the car. After entering into the car, the user may open the windows to lock the zippers (31) again, bringing the screen-like knitting fabrics (2) and the side sunshades (3) to form a complete cover again.

Figure 4:
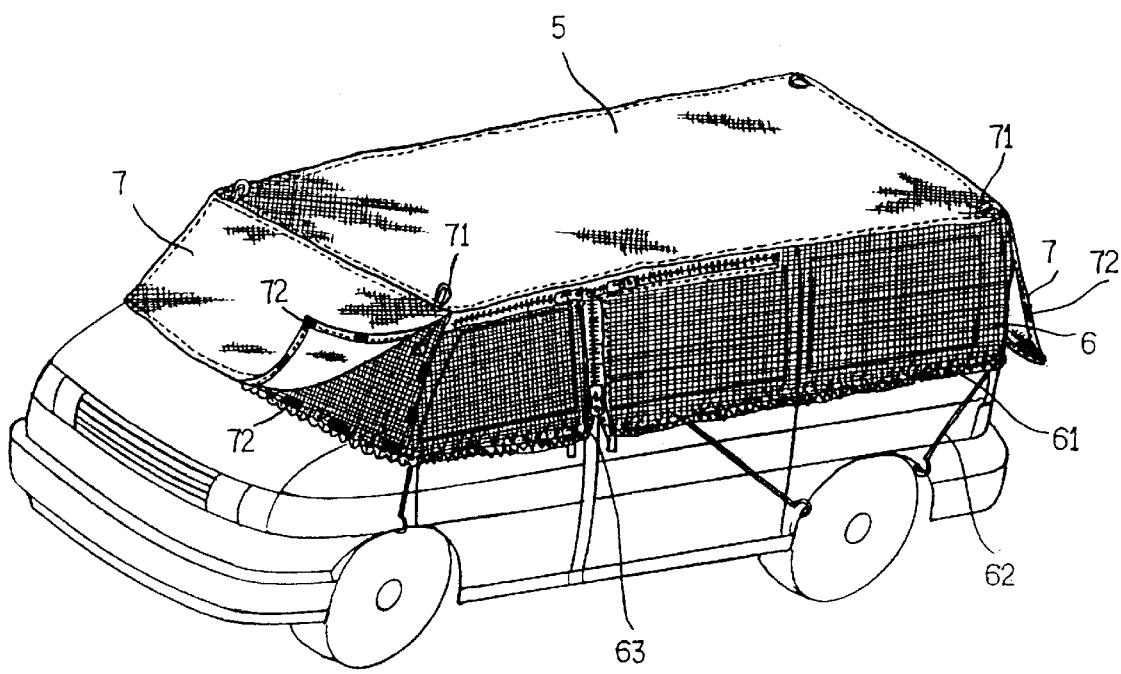
FIG. 4 illustrate the second embodiment of the present invention in FIG. 3 being used to cover a station wagon.
Figure 5:
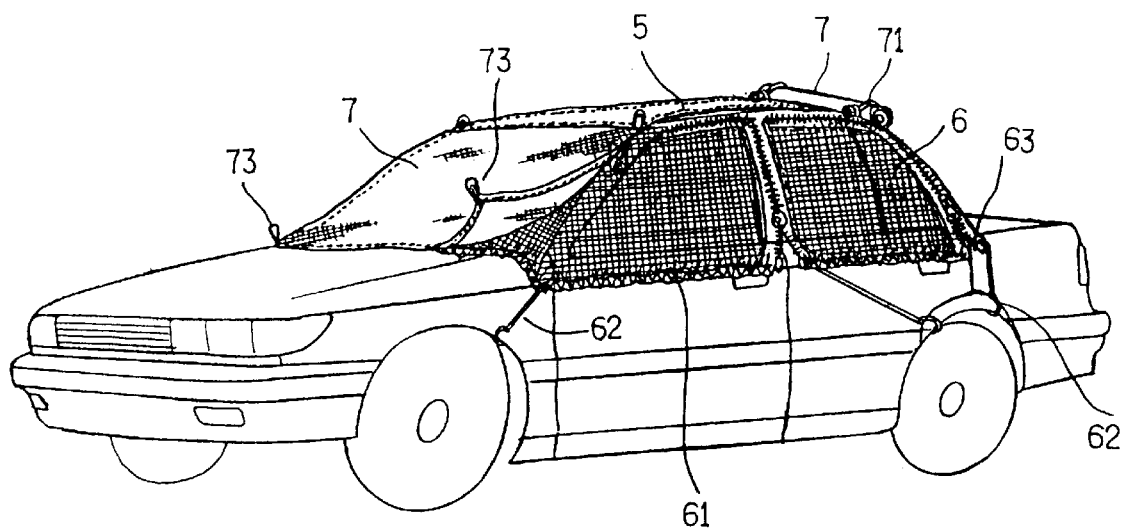
FIG. 5 illustrate the second embodiment of the present invention in FIG. 3 being used to cover a sedan car.

FIGS. 3, 4 and 5 illustrate another embodiment of the present invention. In this second embodiment, there are a roof sunshade (5) for covering the roof, four air-pervious screen-like knitting fabrics (6) for covering the front, the rear, and the side windows, and two roll-up sunshades (7) corresponding to and completely covering the screen-like knitting fabrics (6) covering the front and the rear windows. Upper edges of the screen-like knitting fabrics (6) and the roll-up sunshades (7) are sewed to four edges of the roof sunshades (5), so that they together form a cover to completely cover window glasses at all four sides of the car.

The knitting fabrics (6) are provided at their lower edges with elastic tightening bands (61) and a plurality of hooks (62) each being connected to the knitting fabrics (6) via an elastic band. With the elastic tightening bands (61) elastically binding around a waist portion of the car and the hooks (62) separately hooking at lower edges of the wheel caps and the body, the cover formed from the roof sunshade (5), the screen-like knitting fabrics (6), and the roll-up sunshades (7) can be removably put over the car without the risk of sliding off the car.

Fastening loops (71) are provided to top corners of the two roll-up sunshades (7) for binding and fixing the rolled up sunshades (7) to the roof, so that more sunlight is allowed to shine into the car to brighten the interior of car. Male velcro tapes (72) can be attached to an outer periphery of inner surfaces of the roll-up sunshades (7) at positions corresponding to female velcro tapes (72) attached to outer surfaces of the screen-like knitting fabrics (6), such that when the roll-up sunshades (7) are hanging down from the roof, they are temporarily held to the screen-like knitting fabrics (6) by the mutually gripped male and female velcro tapes (72) without the risk of being blown apart from the knitting fabrics (6) by strong wind. Other similar means can be used to prevent the roll-up sunshades (7) from being blown apart from the knitting fabrics (6). In FIG. 5, there is illustrated two loops (73) being sewed to two lower corners of each roll-up sunshades (7). To fix the roll-up sunshades (7) in place, first connect a hook (62) to each loop (73), and then, hook the hooks (62) to lower edges of the wheel caps or the body. By this way, the whole cover of the present invention can be firmly put over the car and the roll-up sunshades (7) are conveniently fixed in place at the same time.

In the second embodiment illustrated in FIGS. 3, 4, and 5, there are also one or more zippers (63) provided to middle portions of the knitting fabrics (6) covering the side doors, so that the knitting fabrics (6) at two lateral sides of the car can be conveniently zipped open at their middle portions, allowing the doors to be conveniently opened for a user to enter the car.

What is claimed is:

1. A car cover comprising:

a fabric car roof panel having a front edge, a rear edge, and two side edges;

a flexible air-pervious front screen attached to the front edge of said roof panel for covering a car windshield;

a flexible air-pervious rear screen attached to the rear edge of said roof panel for covering a car rear window;

two flexible air-pervious sides screens attached to side edges of said roof panel for covering the car side windows;

said air-pervious screens having side edges connected together, whereby said screens are enabled to collectively cover the upper portion of a car;

said screens having lower edges;

an annular flexible air-impervious skirt attached to the lower edges of said screens for covering the hood and lower portion of a car; said skirt having a lower edge located so that the skirt can completely cover the lower portion of the car;

a front air-impervious flexible sun shade panel attached to the front edge of said roof panel so as to normally overlie said front screen, said front sun shade panel being capable of upward movement to a position above the roof panel for exposing said front screen;

a rear air-impervious flexible sun shade panel attached to the rear edge of said roof panel so as to normally overlie said rear screen, said rear sun shade panel being capable of upward movement to a position above the roof panel for exposing said rear screen;

a flexible air-impervious sun shade side panel attached to each side edge of said roof panel so as to normally overlie each side screen, each said side panel being capable of upward movement to a position above the roof panel for exposing the associated side screen;

a zipper extending generally vertically through each side screen and said flexible skirt, each said zipper extending from a side edge of the roof panel to the lower edge of the skirt and each side screen can be pulled apart for entry into the car while the cover is in place on the car;

each said sun shade panel having two side edges; said sun shade panels being normally oriented on the associated screens, and the side edges on adjacent sun shade panels having zippered sealed connections, whereby the sun shade panels collectively form a weatherlight enclosure around the upper portion of the car.

2. A car cover comprising:

a fabric car roof panel having a front edge, a rear edge, and two side edges;

a flexible air-pervious front screen attached to the front edge of said roof panel for covering a car windshield a flexible air-pervious rear screen attached to the rear edge of said roof panel for covering a car rear window;

two flexible air-previous side screens attached to side edges of said roof panel for covering the car side windows;

said air-pervious screens having side edges connected together, whereby said screens are enabled to collectively cover the upper portion of a car;

said screens having lower edges, plural elastic bands extending downwardly from the lower edges of said screens, and hooks carried by said bands for fastening the car cover to a car;

a front air-impervious flexible sun shade panel attached to the front edge of said roof panel so as to normally overlie said front screen, said front sun shade panel being capable of upward movement to a position above the roof panel for exposing said front screen;

a rear air-impervious flexible sun shade panel attached to the rear edge of said roof panel so as to normally overlie said rear screen, said rear sun shade panel being capable of upward movement to a position above the roof panel for exposing said rear screen;

each said sun shade panel having releasable adhesive means thereon for releasably attaching the respective panel to the associated air-pervious screen;

each said side screen having a zippered seam extending downwardly from the side edge of said roof panel to the screen lower edge, whereby each said zippered seam can be separated to permit the associated car door to be opened for access to the car.

* * * * *